(12) United States Patent
Dachiku

(10) Patent No.: US 8,467,667 B2
(45) Date of Patent: Jun. 18, 2013

(54) VIDEO PLAYBACK DEVICE AND VIDEO PLAYBACK METHOD

(75) Inventor: Kenshi Dachiku, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 236 days.

(21) Appl. No.: 13/022,993

(22) Filed: Feb. 8, 2011

(65) Prior Publication Data

US 2011/0222838 A1    Sep. 15, 2011

(30) Foreign Application Priority Data

Mar. 11, 2010  (JP) ................................. 2010-054915

(51) Int. Cl.
  *H04N 5/93*   (2006.01)
  *H04N 11/02*  (2006.01)
  *H04L 12/56*  (2006.01)

(52) U.S. Cl.
  USPC . 386/353; 370/389; 375/240.01; 375/240.12; 375/240.13; 375/240.15; 375/240.16; 375/240.25

(58) Field of Classification Search
  USPC ........ 386/353, E5.028; 370/389; 375/240.01, 375/240.12, 240.13, 240.15, 240.16, 240.25
  See application file for complete search history.

(56) References Cited

U.S. PATENT DOCUMENTS 6,831,949 B1 * 12/2004 Brightwell et al. ...... 375/240.12
7,869,428 B2 *  1/2011 Shake et al. .................. 370/389

FOREIGN PATENT DOCUMENTS

| | | |
|---|---|---|
| JP | 2001-144705 | 5/2001 |
| JP | 2008-252390 A | 10/2008 |
| JP | 2009-290428 | 12/2009 |
| KR | 10-0839881 B1 | 6/2008 |
| WO | WO 2006/090789 A1 | 8/2006 |

OTHER PUBLICATIONS

Office Action issued Jun. 20, 2012 in Korean Patent Application No. 10-2011-0017323 (with English-language translation).
Japanese Office Action issued Feb. 7, 2012 in patent application No. 2010-054915 with English translation.

* cited by examiner

*Primary Examiner* — Thai Tran
*Assistant Examiner* — Syed Hasan
(74) *Attorney, Agent, or Firm* — Oblon, Spivak, McClelland, Maier & Neustadt, L.L.P.

(57) ABSTRACT

According to an embodiment, a memory creates first packet data and second packet data which are identical to the first packet data, and adds the same serial number to the first packet data and the second packet data. The first packet data is supplied to one port of a decoder through one switch unit, while the second packet data is supplied to the other port of the same decoder through the other switch unit. The decoder checks on the first packet data and the second packet data provided with the same serial number, and thereby monitors whether or not an error occurs in the first packet data and the second packet data. Then, the decoder decodes normal packet data selected from the first packet data and the second packet data, and outputs the decoded data to a video switch.

8 Claims, 2 Drawing Sheets

VIDEO PLAYBACK DEVICE AND VIDEO PLAYBACK METHOD

CROSS-REFERENCE TO RELATED APPLICATION

This application is based upon and claims the benefit of priority from the prior Japanese Patent Application No. 2010-54915, filed on Mar. 11, 2010, the entire contents of which are incorporated herein by reference.

FIELD

The embodiment described herein relates to a video playback device configured to play back content data recorded in memories, and a video playback method used for the video playback device.

BACKGROUND

A conventional video playback device includes: multiple memories configured to store content data; multiple decoders installed for the respective channels, and configured to decode the content data which are read from the memories and output the decoded data; an L2 switch configured to connect the multiple memories and the multiple decoders together through an IP (Internet Protocol) network. This type of video playback device is likely to fail to play back content data normally, in a case where some abnormality occurs in the IP network or the L2 switch. A conventional practice for coping with such a case is that: one video playback device is actually used while a backup video playback device is ready; and once an abnormality occurs in the video playback device in actual use, the backup video playback device takes over the playback operation (see JP, P2001-144705A, for example). In other words, once a trouble occurs in the IP network or the L2 switch in actual use, the video playback device in actual use is replaced with the backup video playback device, and thereby the content data is normally played back.

However, the above-described method needs both the video playback device in actual use and the backup video playback device. For this reason, this method entails problems that: costs for the system construction are high; and the system is large in size.

DETAILED DESCRIPTION

Figure 1:
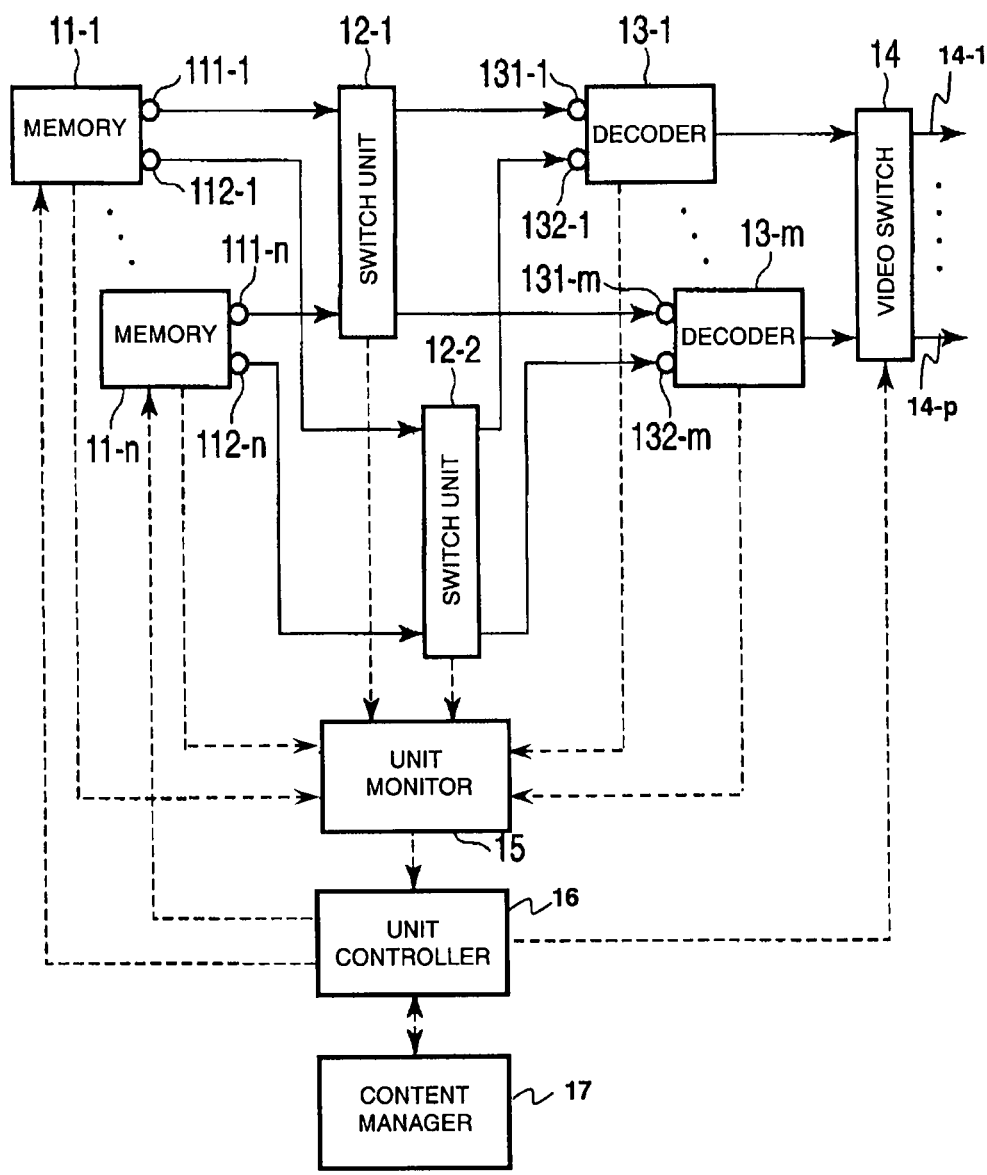
FIG. 1 is a block diagram showing a functional configuration of a video playback device of an embodiment.

According to one embodiment, a video playback device includes: a memory, a first switch unit, a second switch unit, and a decoder. The memory is configured: to record content data; to create first packet data and second packet data on a basis of the content data, the second packet data being identical to the first packet data; to add a serial number and a first IP address added to the first packet data; to output the first packet data added with the serial number and the first IP address; to add a serial number and a second IP address to the second packet data, the serial number being the same as the serial number added to the first packet data; and to output the second packet data added with the serial number and the second IP address. The first switch unit is configured: to receive the first packet data outputted from the memory; and to output the first packet data to the first IP address. The second switch unit is configured: to receive the second packet data outputted from the memory; and to output the second packet data to the second IP address. The decoder includes a first port assigned to the first IP address and a second port assigned to the second IP address. The decoder is configured: to receive the first packet data by use of the first port, the first packet data outputted from the first switch unit to the first port; to receive the second packet data by use of the second port, the second packet data outputted from the second switch unit to the second port; to decode normal packet data selected from the first packet data and the second packet data which have the same serial number; and to output the decoded data.

According to one embodiment, a video playback method includes the steps of: converting recorded content data to first packet data and second packet data which are identical to each other; adding a serial number and an IP address added to the first packet data; outputting the first packet data added with the serial number and the IP address to a first switch unit; adding a serial number and an IP address added to the second packet data, the serial number being the same as the serial numbers added to the first packet data, the IP address being different from the IP address added to the first packet data; outputting the second packet data added with the serial number and the IP address to a second switch unit; causing a decoder to receive the first packet data by use of a first port through the first switch unit, the first port assigned to the IP address which is added to the first packet data; causing the decoder to receive the second packet data by use of a second port through the second switch unit, the second port assigned to the IP address which is added to the second packet data; and causing the decoder to decode normal packet data selected from the first packet data and the second packet data which have the same serial number.

Referring to the drawings, detailed descriptions will be herein below provided for a video playback device of an embodiment.

FIG. 1 is a block diagram showing a functional configuration of the video playback device of the embodiment. The video playback device includes memories 11-1 to 11-$n$ ($n$ is a natural number), switch units 12-1, 12-2, decoders 13-1 to 13-$m$ ($m$ is a natural number satisfying p<m<2p, where p denotes the number of channels), a video switch 14, a unit monitor 15, a unit controller 16 and a content manager 17. The memories 11-1 to 11-$n$, the switch units 12-1, 12-2 and the decoders 13-1 to 13-$m$ are connected together through an IP network. Incidentally, ports 111-1 to 111-$n$ of the memories 11-1 to 11-$n$ are connected to the switch unit 12-1, and ports 112-1 to 112-$n$ of the memories 11-1 to 11-$n$ are connected to the switch port 12-2, through their individual lines. In addition, the switch unit 12-1 is connected to ports 131-1 to 131-$m$ of the decoders 13-1 to 13-$m$, and the switch unit 12-2 is connected to ports 132-1 to 132-$m$ of the decoders 13-1 to 13-$m$, through their individual lines.

The memories 11-1 to 11-$n$ record sets of content data. In this respect, multiple (at least two, for example) memories of the memories 11-1 to 11-$n$ record the same set of content data.

Among sets of content data recorded in the memory 11-1, a set of content data specified by playback control from the outside is sequentially converted to pieces of packet data by the memory 11-1. Thereby, the memory 11-1 creates pieces of first packet data. In addition, the memory 11-1 creates pieces of second packet data by duplicating the pieces of the first packet data. In this respect, the pieces of the first packet data and the pieces of the second packet data are identical to each other.

The memory 11-1 adds the same serial number to a piece of the first packet data and a piece of the second packet data. In addition, an IP address of a first port of a decoder which is specified by the playback control among the decoders 13-1 to 13-$m$ is added to the piece of the first packet data by the memory 11-1. An IP address of a second port of this decoder is added to the piece of the second packet data by the memory 11-1. The memory 11-1 outputs the piece of the first packet data from its first port 111-1 to the switch unit 12-1, and outputs the piece of the second packet data from its second port 112-1 to the switch unit 12-2. Subsequently, the memory 11-1 sequentially subjects the remaining pieces of the first packet data to the above-described process, and outputs the remaining pieces of the first packet data to the switch unit 12-1, and outputs the remaining pieces of the second packet data to the switch unit 12-2.

It should be noted that each of the memories 11-2 to 11-$n$ performs the same operation as does the memory 11-1, and outputs its pieces of the first packet data and second packet data to the decoders which are specified by the playback control.

The switch units 12-1, 12-2 are L2 switches, for example. The switch unit 12-1 receives the pieces of the first packet data from the memories 11-1 to 11-$n$, and outputs the pieces of the first packet data to the first ports 131-1 to 131-$m$ of the decoders 13-1 to 13-$m$ in accordance with the IP address added to the pieces of the first packet data. In addition, the switch unit 12-2 receives the pieces of the second packet data from the memories 11-1 to 11-$n$, and outputs the pieces of the second packet data to the second ports 132-1 to 132-$m$ of the decoders 13-1 to 13-$m$ in accordance with the IP address added to the pieces of the second packet data.

The decoders 13-1 to 13-$m$ receive the pieces of the first packet data from the switch unit 12-1 through their first ports 131-1 to 131-$m$, and receive the pieces of the second packet data from the switch unit 12-2 through their second ports 132-1 to 132-$m$.

The decoder 13-1 checks whether or not each pair consisting of a piece of the first packet data and a piece of the second packet data provided with the same serial number is received, and thereby monitors whether or not any one of the piece of the first packet data and the piece of the second packet data is lost. In addition, the decoder 13-1 monitors whether or not an error occurs in the piece of the first packet data and the piece of the second packet data provided with the same serial number. The decoder 13-1 decodes a normal piece of packet data selected from the piece of the first packet data and the piece of the second packet data provided with the same serial number, and outputs the decoded piece of data to the video switch 14. It should be noted that each of the decoders 13-2 to 13-$m$ performs the same operation as does the decoder 13-1, and decodes a normal piece of packet data selected from the piece of the first packet data and the piece of the second packet data thus received, and outputs the decoded piece of data to the video switch 14.

In accordance with a switch signal from the unit controller 16, the video switch 14 outputs each decoded piece of data, which is outputted from one of the decoders 13-1 to 13-$m$, to a predetermined one of output lines 14-1 to 14-$p$ ($p$ is a natural number).

The unit monitor 15 monitors the conditions of memories in operation among the memories 11-1 to 11-$n$, the conditions of decoders in operation among the decoders 13-1 to 13-$m$, and the conditions of the switch units 12-1, 12-2. The memories in operation among the memories 11-1 to 11-$n$, the decoders in operation among the decoders 13-1 to 13-$m$, and the switch units 12-1, 12-2 post notice about the occurrence of an abnormality to the unit monitor 15, once detecting the occurrence of the abnormality of their own. Once receiving the notice about the occurrence of the abnormality from any one of the memories in operation, the unit monitor 15 outputs a first abnormality occurrence signal to the unit controller 16. In addition, once receiving the notice about the occurrence of the abnormality from any one of the decoders in operation, the unit monitor 15 outputs a second abnormality occurrence signal to the unit controller 16. Furthermore, once receiving the notice about the occurrence of the abnormality from either of the switch units 12-1, 12-2, the unit monitor 15 outputs a third abnormality occurrence signal to the unit controller 16.

The content manager 17 records management information on the sets of content data which are recorded in the memories 11-1 to 11-$n$. The management information includes pieces of information such as the names, identification numbers, acquisition dates, data lengths, recording time lengths, storing memories, and current statuses of the sets of content data, respectively.

Next, descriptions will be provided for an operation which is carried out when an abnormality occurs in any one of the memories, decoders and switch units.

Let us assume that an abnormality occurs in the first memory 11-1. As described above, the first memory 11-1 posts notice about the occurrence of the abnormality to the unit monitor 15, and the unit monitor 15 outputs the first abnormality occurrence signal to the unit controller 16. Once receiving the first abnormality occurrence signal, the unit controller 16 refers to the management information recorded in the content manager 17, and searches for a memory which records a set C2 of content data identical to a set C1 of content data having been outputted from the first memory 11-1 in which the abnormality occurs. Subsequently, once finding that the second memory records the set C2 of content data, the unit controller 16 outputs a control signal to the first memory 11-1 in order for the first memory 11-1 to stop its operation, and outputs a control signal to the second memory 11-2 in order for the second memory 11-2 to output the set C2 of content data. On this occasion, the unit controller 16 controls the second memory 11-2 in order that the location in which the output of the set C2 of content data is started coincides with the location in which the output of the set C1 of content data is suspended. Furthermore, the unit controller 16 controls the second memory in order that the second memory output the set C2 of content data to the first decoder to which the set C1 of content data has been outputted. The content manager 17 updates the management information after the unit controller 16 switches the memories. By this, the set C2 of content data in lieu of the set C1 of content data is outputted from the second memory 11-2 to the first decoder.

Next, let us assume that an abnormality occurs in the second decoder 13-2. As described above, the second decoder 13-2 posts notice about the occurrence of the abnormality to the unit monitor 15, and the unit monitor 15 outputs the second abnormality occurrence signal to the unit controller 16. Once receiving the second abnormality occurrence signal, the unit controller 16 controls the memory having outputted the set of content data to the second decoder in which the abnormality occurs in order that the set of content data is outputted to the third decoder 13-3 in which no abnormality occurs. In addition, the unit controller 16 outputs a switch signal to the video switch 14 in order that the third decoder 13-3 outputs a signal to the output line to which the second decoder 13-2 has outputted a signal through the video switch 14. On the basis of the switch signal, the video switch 14 switches its internal connections.

Next, let us assume that an abnormality occurs in the switch unit 12-1. As described above, the switch unit 12-1 posts notice about the occurrence of the abnormality to the unit monitor 15, and the unit monitor 15 outputs the third abnormality occurrence signal to the unit controller 16. Once receiving the third abnormality occurrence signal, the unit controller 16 posts notice about the occurrence of the abnormality in the switch unit 12-1 to the outside. Even if an abnormality occurs in any one of the two switch units, the video continues being outputted normally. However, the switch unit in which the abnormality occurs needs to be replaced immediately. For this reason, this notice informs the user that the switch in which the abnormality occurs should be replaced.

Figure 2:
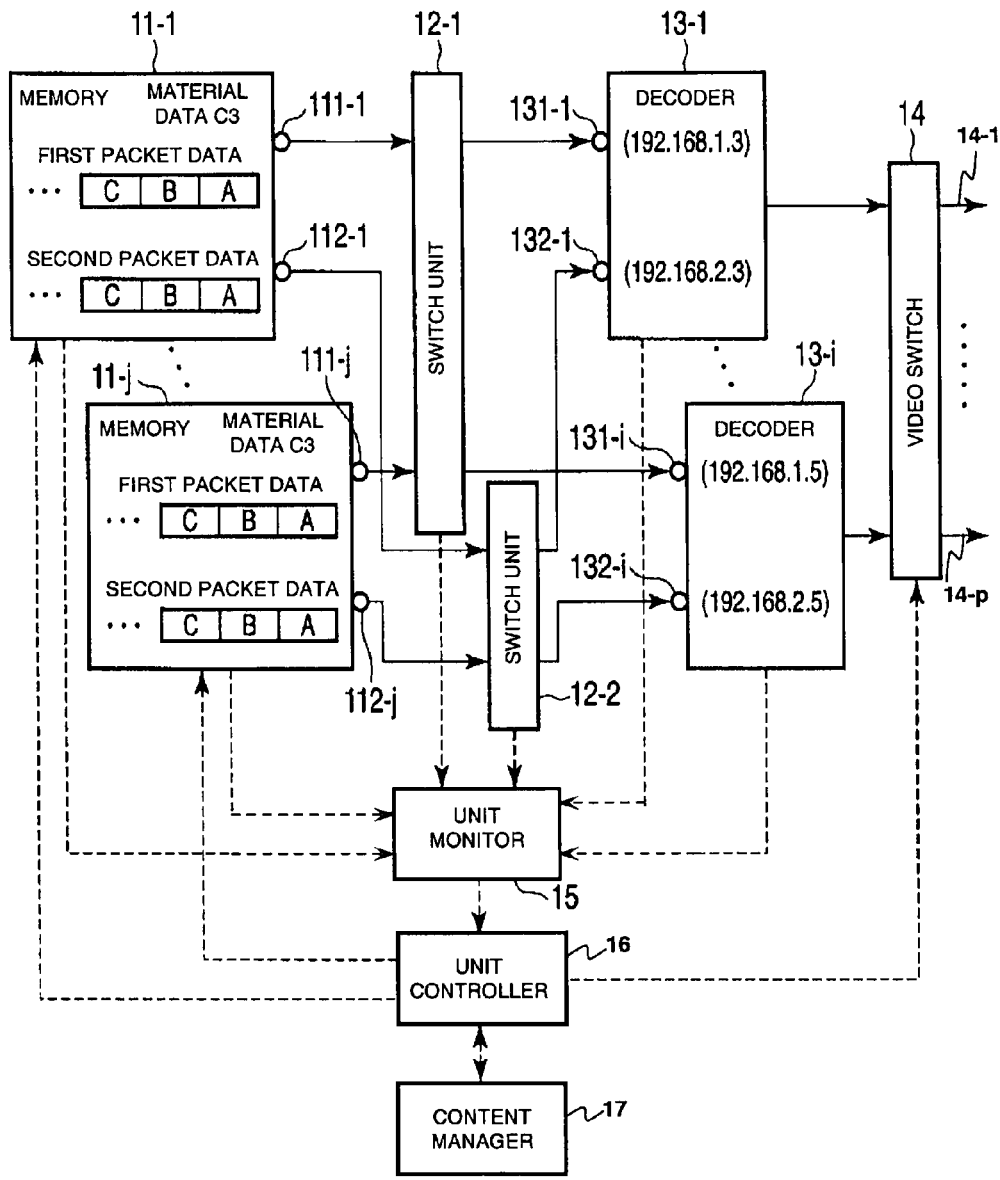
FIG. 2 is a diagram for explaining how the video playback device shown in FIG. 1 operates.

Next, descriptions will be provided for how the video playback device configured as described above operates. FIG. 2 is a schematic diagram for explaining how the video playback device shown of the embodiment operates.

First of all, descriptions will be provided for how the video playback device performs a normal operation. In FIG. 2, the memory 11-1 stores a set C3 of content data, and converts the set C3 of content data to the pieces A, B, C, . . . of the first packet data, and creates the pieces A, B, C, . . . of the second packet data by duplicating the pieces A, B, C, . . . of the first packet data. In this respect, the pieces A, B, C, . . . of the first packet data in FIG. 2 are respectively identical to the pieces A, B, C, . . . of the second packet data. Each packet consists of a corresponding image frame of data, or a set of data associated with a corresponding GOP (Group of Picture).

In addition, the memory 11-1 adds the serial number "1" and the IP address (192.168.1.3) of the first port 131-1 of the decoder 13-1 to the piece A of the first packet data. Furthermore, the memory 11-1 outputs the resultant piece A of the first packet data from the first port 111-1 of the memory 11-1. Subsequently, the memory 11-1 adds the serial number "2" and the IP address (192.168.1.3) to the piece B of the first packet data, and outputs the resultant piece B of the first packet data from the first port 111-1 thereof. Thereafter, the memory 11-1 adds the serial number "3" and the IP address (192.168.1.3) to the piece C of the first packet data, and outputs the resultant piece C of the first packet data from the first port 111-1 thereof.

The memory 11-1 adds the serial number "1" and the IP address (192.168.2.3) of the second port 132-1 of the decoder 13-1 to the piece A of the second packet data. Furthermore, the memory 11-1 outputs the resultant piece A of the second packet data from the second port 112-1 of the memory 11-1. Subsequently, the memory 11-1 adds the serial number "2" and the IP address (192.168.2.3) to the piece B of the second packet data, and outputs the resultant piece B of the second packet data from the second port 112-1 thereof. Thereafter, the memory 11-1 adds the serial number "3" and the IP address (192.168.2.3) to the piece C of the second packet data, and outputs the resultant piece C of the second packet data from the second port 112-1 thereof.

The switch unit 12-1 receives the pieces A, B, C, . . . of the first packet data from the memory 11-1, and outputs the pieces A, B, C, . . . of the first packet data to the first port 131-1 of the decoder 13-1 in accordance with the IP address added to the pieces A, B, C, . . . of the first packet data. In addition, the switch units 12-2 receives the pieces A, B, C, . . . of the second packet data from the memory 11-1, and outputs the pieces A, B, C, . . . of the second packet data to the second port 132-1 of the decoder 13-1 in accordance with the IP address added to the pieces A, B, C, . . . of the second packet data.

The decoder 13-1 checks on each pair consisting of a piece of the first packet data and a piece of the second packet data provided with the same serial number which are included in the pieces of the packet data received through its first and second ports 131-1, 132-1. In other words, the decoder 13-1 checks whether both the piece A of the first packet data provided with the serial number "1" and the piece A of the second packet data provided with the serial number "1" are received. Thereby, the decoder 13-1 judges whether or not any one of the piece A of the first packet data and the piece A of the second packet data is lost. Furthermore, the decoder 13-1 judges whether or not an error occurs in the piece A of the first packet data provided with the serial number "1" and the piece A of the second packet data provided with the serial number "1". For example, in a case where the decoder 13-1 receives the piece A of the first packet data alone, the decoder 13-1 regards the piece A of the second packet data as being lost, and decodes the piece A of the first packet data, and outputs its decoded piece of data to the video switch 14. Meanwhile, in a case where an error occurs in the piece A of the first packet data, the decoder 13-1 decodes the piece A of the second packet data, and outputs its decoded piece of data to the video switch 14.

The decoder 13-1 subjects the pieces B, C, . . . of the first packet data and the pieces B, C, . . . of the second packet data to the same process as the piece A of the first packet data and the piece A of the second packet data is subjected to. Thereby, the decoder 13-1 decodes normal pieces of packet data, and outputs its decoded pieces of data to the video switch 14.

Next, referring to FIG. 2, descriptions will be provided for how the video playback device operates in a case where an abnormality occurs in the memory 11-1. In this case, let us assume that the memory 11-1 goes out of order when outputting the piece B of the first packet data and the piece B of the second packet data. The memory 11-1 posts notice about the occurrence of the abnormality to the unit monitor 15. Once detecting the occurrence of the abnormality in the memory 11-1, the unit monitor 15 outputs the first abnormality occurrence signal to the unit controller 16.

Once receiving the first abnormality occurrence signal, the unit controller 16 refers to the management information recorded in the content manager 17, and searches for another memory in which the set C3 of content data is stored. Once finding the memory 11-*j* in which the set C3 of content data is stored, the unit controller 16 causes the memory 11-1 to stop its operation. In addition, the unit controller 16 controls the memory 11-*j* in order for the memory 11-*j* to output the pieces of packet data respectively identical to the piece B of the first packet data and the piece B of the second packet data which are outputted when the memory 11-1 goes out of order. In other words, the unit controller 16 controls the memory 11-*j* in order that the memory 11-*j* adds the serial number "2" and the IP address (192.168.1.3) of the first port 131-1 of the decoder 13-1 to the piece B of the first packet data, and outputs the piece B of the first packet data added with the serial number "2" and the IP address (192.168.1.3). Furthermore, the unit controller 16 controls the memory 11-*j* in order that the memory 11-*j* adds the serial number "2" and the IP address (192.168.2.3) to the piece B of the second packet data, and outputs the piece B of the second packet data added with the serial number "2" and the IP address (192.168.2.3). The piece of the first packet data following the piece B of the first packet data and the piece of the second packet data following the piece B of the second packet data are outputted from the memory 11-*j* as well.

Next, referring to FIG. 2, descriptions will be provided for how the video playback device operates in a case where an abnormality occurs in the decoder 13-1. In this case, the decoder 13-1 posts notice about the occurrence of the abnormality to the unit monitor 15. Once detecting the occurrence of the abnormality in the decoder 13-1, the unit monitor 15 outputs the second abnormality occurrence signal to the unit controller 16.

Once receiving the second abnormality occurrence signal, the unit controller 16 searches for a decoder which is not in operation. Let us assume that the decoder 13-*i* is not in operation in FIG. 2. The unit controller 16 controls the memory 11-1 in order that the memory 11-1 adds the IP address (192.168.1.5) of the first port 131-*i* of the decoder 13-*i* to the pieces A, B, C, . . . of the first packet data. In addition, the unit controller 16 controls the memory 11-1 in order that the memory 11-1 adds the IP address (192.168.2.5) of the second port 132-*i* of the decoder 13-*i* to the pieces A, B, C, . . . of the second packet data.

Furthermore, the unit controller 16 outputs the switch signal to the video switch 14 in order that the decoder 13-*i* outputs a signal to a predetermined one of the output lines 14-1 to 14-*p* to which the decoder 13-1 has outputted the signal through the video switch 14. On the basis of the switch signal, the video switch 14 switches the internal connections.

As described above, in the foregoing embodiment, each of the memories 11-1 to 11-*n* creates the first packet data and the second packet data which are identical to the first packet data, and adds the same serial number to the first packet data and the second packet data. The first packet data is supplied to one port of a decoder through one switch unit 12-1, while the second packet data is supplied to the other port of the same decoder through the other switch unit 12-2. Each of the decoders 13-1 to 13-*m* checks on the first packet data and the second packet data provided with the same serial number, and thereby monitors whether or not any one of the first packet data and the second packet data is lost, and whether or not an error occurs in the first packet data and the second packet data. Thus, each of the decoders 13-1 to 13-*m* decodes normal packet data, and outputs its decoded data to the video switch 14. The video switch 14 outputs the decoded signal to the predetermined output line.

Thereby, each of the decoders 13-1 to 13-*m* is capable of decoding the normal packet data, even if an abnormality occurs in either of the switch units 12-1, 12-2, or in the IP network between the memories 11-1 to 11-*n* and the decoders 13-1 to 13-*m*. Furthermore, because each of the decoders 13-1 to 13-*m* is configured to check on pieces of packet data provided with the same serial number, each of the decoders 13-1 to 13-*m* is capable of comparing any piece of the first packet data and its corresponding piece of the second packet data even if a differential delay occurs due to the difference between their respective transmission paths.

Moreover, in the foregoing embodiment, the multiple memories 11-1 to 11-*n* are provided. At least two memories record the same set of content data, and each of the memories creates the first packet data and the second packet data which is identical to the first packet data. The unit monitor 15 monitors the conditions of the respective memories in operation. In a case where an abnormality occurs, the unit controller 16 switches the memory to be in operation from the memory in which the abnormality occurs to a normal memory in which the same set of content data is recorded. In other words, the unit controller 16 causes the normal memory to output the first packet data and the second packet data in the set of content data. This prevents the output of the set of content data from being discontinued even when an abnormality occurs in the memories 11-1 to 11-*n*.

Furthermore, in the foregoing embodiment, the multiple decoders 13-1 to 13-*m* are provided. The unit monitor 15 monitors the conditions of the respective decoders in operation. In a case where an abnormality occurs, the unit controller 16 switches the destination of the packet data, which is outputted from the memory, from the decoder in which the abnormality occurs to a normal decoder. Furthermore, the unit controller 16 controls the video switch 14 in order that the video switch 14 outputs the signal from this normal decoder to the predetermined output line. This causes the normal decoder to decode the set of content data, and prevents the output of the set of content data from being discontinued, even if the abnormality occurs in any one of the decoders 13-1 to 13-*m*. In addition, because the number m of decoders satisfies p<m<2p, the number of decoders is smaller than the number of decoders (which is double the number of channels), for example, included in two video playback devices.

Additionally, in the foregoing embodiment, the unit monitor 15 monitors the conditions of the respective switch units 12-1, 12-2. In a case where an abnormality occurs, the unit controller 16 posts notice about the occurrence of the abnormality to the outside. This prompts the switch units 12-1, 12-2 to be repaired immediately.

In the video playback device and the video playback method which have the above-described configuration, each memory creates the first packet data and the second packet data which is identical to the first packet data, and adds the same serial number to the first packet data and the second packet data. The first packet data is supplied to one port of a decoder through one switch unit, while the second packet data is supplied to the other port of the same decoder through the other switch unit. The decoder checks on the first packet data and the second packet data provided with the same serial number, and thereby monitors whether or not any one of the first packet data and the second packet data is lost, and whether or not an error occurs in the first packet data and the second packet data. Thus, the decoder decodes normal packet data, and outputs its decoded data to the video switch. This enables the decoder to decode the normal packet data, even if an abnormality occurs in either of the switch units, or in the IP network between the memories and the decoders. For this reason, unlike the conventional video playback device, the video playback device of the embodiment need not have a redundant configuration which is built up by use of multiple video playback devices. Accordingly, the video playback device of the embodiment can inhibit the price and the size of the system which would otherwise increase.

The video playback device of the embodiment is provided with not only the multiple switch units but also the multiple memories and the multiple decoders. For this reason, the video playback device is capable of playing back any set of content data normally even if an abnormality occurs in the memories, the decoders, the switch units or the IP network. In other words, unlike the conventional video playback device, the video playback device of the embodiment need not have a redundant configuration which is built up by use of multiple video playback devices. Accordingly, the video playback device of the embodiment can inhibit the price and the size of the system which would otherwise increase.

It should be noted that this invention is not limited to the above-described embodiment. For example, although the foregoing descriptions have been provided for the embodiment in which the two switch units 12-1, 12-2 are installed, this invention is not limited to this case. In other words, three or more switch units may be installed. Incidentally, the number of ports of the memories 11-1 to 11-*n* and the number of ports of the decoders 13-1 to 13-*m* needs to be increased in accordance with the number of switch units.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video playback device comprising:
a plurality of memories including a first memory and a second memory,
each of the first and second memories configured
to record content data, and
to create first packet data and second packet data on a basis of the content data, the second packet data being identical to the first packet data, and
one of the first and second memories configured
to add a serial number and an IP address added to the first packet data,
to output the first packet data added with the serial number and the IP address,
to add a serial number and an IP address added to the second packet data, the serial number being the same as the serial number added to the first packet data, and the IP address being different from the IP address added to the first packet data;
to output the second packet data added with the serial number and the IP address; and
a first switch unit configured
to receive the first packet data outputted from the one of the first and second memories, and
to output the first packet data to the IP address added to the first packet data;
a second switch unit configured
to receive the second packet data outputted from the one of the first and second memories, and
to output the second packet data to the IP address added to the second packet data;
a plurality of decoders including a first decoder and a second decoder,
the first decoder including a first port assigned to a first IP address and a second port assigned to a second IP address, the first decoder configured
to receive the first packet data by use of the first port, the first packet data outputted from the first switch unit to the first port,
to receive the second packet data by use of the second port, the second packet data outputted from the second switch unit to the second port,
to decode normal packet data selected from the first packet data and the second packet data which have the same serial number, and
to output the decoded data, and
the second decoder including a first port assigned to a third IP address and a second port assigned to a fourth IP address, the second decoder configured
to receive the first packet data by use of the first port of the second decoder, the first packet data outputted from the first switch unit to the first port of the second decoder,
to receive the second packet data by use of the second port of the second decoder, the second packet data outputted from the second switch unit to the second port of the second decoder,
to decode normal packet data selected from the first packet data and the second packet data which have the same serial number, and
to output the decoded data; and
a video switch configured
to select one of the data outputted from the first decoder and the data outputted from the second decoder, and
to output the selected data to a selected line.

2. The video playback device according to claim 1, further comprising:
a unit monitor configured to generate a first abnormality occurrence signal once detecting occurrence of an abnormality in any one of memories in operation among the plurality of memories;
a content manager configured to manage management information on the content data recorded in each of the plurality of memories; and
a unit controller configured
to refer to the management information in response to the first abnormality occurrence signal,
to search for a different memory which records content data identical to content data recorded in the memory in which the abnormality occurs, and
to control the different memory
in order that the different memory adds the serial number and the IP address having been added to the first packet data in the memory in which the abnormality occurs to the first packet data which is recorded in the different memory based on the content data, and outputs the first packet data in the different memory to the first switch unit, and
in order that the different memory add the serial number and the IP address having been added to the second packet data which is recorded in the different memory, and outputs the second packet data in the different memory to the second switch unit.

3. The video playback device according to claim 1, further comprising:
a unit monitor configured
to monitor conditions of decoders in operation among the plurality of decoders, and
to generate a first abnormality occurrence signal once detecting occurrence of an abnormality in any one of the decoders in operation; and
a unit controller configured, in response to the first abnormality occurrence signal,
to control the memory, which has outputted the first packet data and the second packet data to the decoder in which the abnormality occurs through the first switch unit and the second switch unit, in order that the memory changes an output destination of the first packet data and the second packet data to a normal decoder, and
to control the video switch in order that the video switch outputs data from the normal second decoder, in lieu of data from the decoder in which the abnormality occurs, to the selected output line.

4. The video playback device according to claim 2, wherein the unit monitor further monitors conditions of decoders in operation among the plurality of decoders, and generates a second abnormality occurrence signal in a case where an abnormality occurs in any one of the decoders in operation, and
in response to the second abnormality occurrence signal, the unit controller controls the memory, which has outputted the first packet data and the second packet data to the decoder in which the abnormality occurs through the first switch unit and the second switch unit, in order that the memory changes an output destination of the first packet data and the second packet data to a normal decoder; and the unit controller controls the video switch in order that the video switch outputs data from the normal second decoder, in lieu of data from the decoder in which the abnormality occurs, to the selected output line.

5. The video playback device according to claim 4, wherein the unit controller controls the memory in order that the memory changes the IP address to be added to the first packet data to an IP address assigned to the first port of the normal decoder, and changes the IP address to be added to the second packet data to an IP address assigned to the second port of the normal decoder.

6. The video playback device according to any one of claims 2, 3, and 4, wherein the unit monitor further monitors the first switch unit and the second switch unit, and generates a third abnormality occurrence signal in a case where an abnormality occurs in any one of the first switch unit and the second switch unit, and in response to the third abnormality occurrence signal, the unit controller posts notice about the occurrence of the abnormality in the one of the first switch unit and the second switch unit to an outside.

7. The video playback device according to claim 3, wherein the unit controller controls the memory in order that the memory changes the IP address to be added to the first packet data to an IP address assigned to the first port of the normal decoder, and changes the IP address to be added to the second packet data to an IP address assigned to the second port of the normal decoder.

8. The video playback device according to claim 1, wherein each memory of the plurality of memories includes a first port and a second port, the video playback device further comprising:

a plurality of first lines, each first line configured to connect the first port of each memory and the first switch unit;

a plurality of second lines, each second line configured to connect the second port of each memory and the second switch unit;

a plurality of third lines, each third line configured to connect the first port of each decoder of the plurality of decoders and the first switch unit; and a plurality of fourth lines, each fourth line configured to connect the second port of each decoder and the second switch unit.

* * * * *